(12) United States Patent
Kano et al.

(10) Patent No.: US 9,542,912 B2
(45) Date of Patent: Jan. 10, 2017

(54) INFORMATION PROCESSING DEVICE AND PROGRAM

(75) Inventors: Izua Kano, Tokyo (JP); Kazuhiro Yamada, Tokyo (JP); Dai Kamiya, Tokyo (JP); Yasushi Onda, Tokyo (JP); Keiichi Murakami, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 404 days.

(21) Appl. No.: 12/808,288

(22) PCT Filed: Dec. 15, 2008

(86) PCT No.: PCT/JP2008/072779
§ 371 (c)(1),
(2), (4) Date: Jun. 15, 2010

(87) PCT Pub. No.: WO2009/087864
PCT Pub. Date: Jul. 16, 2009

(65) Prior Publication Data
US 2011/0154251 A1    Jun. 23, 2011

(30) Foreign Application Priority Data
Jan. 8, 2008  (JP) .................................. 2008-001535

(51) Int. Cl.
*G09G 5/14* (2006.01)
*G06F 3/048* (2013.01)
(Continued)

(52) U.S. Cl.
CPC ................ *G09G 5/14* (2013.01); *G06F 3/048* (2013.01); *G06F 3/14* (2013.01);
(Continued)

(58) Field of Classification Search
CPC ................ G06F 17/30716; G06F 3/048; G06F 17/30017; G09G 2340/0464; G09G 5/14; G06G 17/30716; G06T 7/00
(Continued)

(56) References Cited

U.S. PATENT DOCUMENTS 5,001,697 A    3/1991  Torres
5,062,060 A *  10/1991 Kolnick ................ G06F 3/0481
                                                715/800

(Continued)

FOREIGN PATENT DOCUMENTS

CN        1606309 A    4/2005
JP        02025918     1/1990
(Continued)

OTHER PUBLICATIONS

Ask Search Engine Search, ask search q=yuy+format&qsrc=0&o=0&l=dir, search performed Dec. 5, 2012.*
(Continued)

*Primary Examiner* — Jeffrey A Gaffin
*Assistant Examiner* — John M Heffington
(74) *Attorney, Agent, or Firm* — MKG, LLC

(57) ABSTRACT

An information processing device includes: execution means for executing an application program; determination means for determining a size of a window to be displayed depending on the application program; receiving means for receiving at least one data set from among a plurality of data sets; data selection means for selecting one data set from among the plurality of data sets, depending on the window size determined by the determination unit; execution control means for controlling the execution means to process the one data set selected by the data selection means from among the received at least one data set, in accordance with the application program; and display control means for
(Continued)

controlling the display means to show a screen based on the one data set to be processed by the execution means.

19 Claims, 6 Drawing Sheets

(51) Int. Cl.
    *G06T 7/00*     (2006.01)
    *G06F 17/30*     (2006.01)
    *G06F 3/14*     (2006.01)

(52) U.S. Cl.
    CPC .. *G06F 17/30017* (2013.01); *G06F 17/30716* (2013.01); *G06T 7/00* (2013.01); *G09G 2340/0407* (2013.01); *G09G 2340/0464* (2013.01); *G09G 2340/145* (2013.01); *G09G 2360/02* (2013.01)

(58) Field of Classification Search
    USPC .................................................. 715/800, 703
    See application file for complete search history.

(56) References Cited

U.S. PATENT DOCUMENTS

| | | | |
|---|---|---|---|
| 5,369,617 A * | 11/1994 | Munson ........................ 365/219 |
| 5,544,354 A * | 8/1996 | May et al. |
| 5,559,548 A * | 9/1996 | Davis et al. .................... 725/40 |
| 5,590,271 A * | 12/1996 | Klinker ......................... 715/763 |
| 5,594,807 A * | 1/1997 | Liu ................................ 382/128 |
| 5,635,978 A * | 6/1997 | Alten et al. ..................... 725/42 |
| 5,671,366 A * | 9/1997 | Niwa .................... G06F 1/1632 710/303 |
| 5,721,835 A * | 2/1998 | Niwa .................... G06F 1/1632 710/303 |
| 5,831,935 A * | 11/1998 | Luo et al. ........................ 367/47 |
| 5,876,342 A * | 3/1999 | Chen et al. .................... 600/443 |
| 5,983,261 A * | 11/1999 | Riddle .................... H04L 29/06 709/204 |
| 5,986,974 A * | 11/1999 | Luo et al. ........................ 367/41 |
| 5,999,126 A * | 12/1999 | Ito .......................... G01C 21/28 342/357.25 |
| 6,071,317 A * | 6/2000 | Nagel ........................ G06F 8/78 717/128 |
| 6,219,837 B1 * | 4/2001 | Yeo .................... G06F 17/30843 348/564 |
| 6,317,384 B1 * | 11/2001 | Luo et al. ........................ 367/47 |
| 6,384,846 B1 | 5/2002 | Hiroi |
| 6,549,217 B1 * | 4/2003 | De Greef et al. ............. 715/745 |
| 6,947,147 B2 * | 9/2005 | Motamedi et al. ........... 356/479 |
| 6,983,424 B1 | 1/2006 | Dutta |
| 7,047,247 B1 * | 5/2006 | Petzold et al. ................. 701/425 |
| RE39,135 E * | 6/2006 | Riddle .................... H04L 29/06 709/204 |
| 7,788,198 B2 * | 8/2010 | Liu et al. ......................... 706/45 |
| 7,788,596 B2 * | 8/2010 | Iwabuchi ....................... 715/800 |
| 7,847,725 B1 * | 12/2010 | Houlberg ................ F41G 7/001 342/182 |
| 7,949,954 B1 * | 5/2011 | Jezek, Jr. ....................... 715/800 |
| 7,965,801 B1 * | 6/2011 | O'Reilly .............. H04L 7/0338 375/340 |
| 8,286,090 B2 * | 10/2012 | Ballard et al. ................. 715/781 |
| 8,522,142 B2 * | 8/2013 | Bhatla ...................... G09G 5/14 715/719 |
| 2002/0082730 A1 * | 6/2002 | Capps .................... H04N 21/40 700/94 |
| 2002/0089549 A1 | 7/2002 | Munro et al. |
| 2002/0129089 A1 * | 9/2002 | Hegde ................... H04L 29/06 709/200 |
| 2003/0126607 A1 * | 7/2003 | Phillips .............. H04N 5/44543 725/55 |
| 2004/0005900 A1 * | 1/2004 | Zilliacus ............ H04N 7/17318 455/466 |
| 2004/0036886 A1 * | 2/2004 | Motamedi et al. ........... 356/477 |
| 2004/0103434 A1 * | 5/2004 | Ellis .................... H04N 5/44543 725/58 |
| 2004/0154040 A1 * | 8/2004 | Ellis .................... H04N 5/44543 725/58 |
| 2004/0189872 A1 * | 9/2004 | Amendolagine ........ H04N 9/74 348/578 |
| 2004/0205087 A1 * | 10/2004 | Dorsey ............... H04N 1/00408 |
| 2004/0205217 A1 * | 10/2004 | Gabrani et al. .............. 709/231 |
| 2004/0205543 A1 * | 10/2004 | Awada et al. ................. 715/512 |
| 2005/0071758 A1 * | 3/2005 | Ehrich ................ G06F 9/4443 715/234 |
| 2005/0081158 A1 | 4/2005 | Hwang |
| 2005/0110748 A1 * | 5/2005 | Boeing et al. ................ 345/156 |
| 2005/0138545 A1 * | 6/2005 | Saint-Hilaire et al. ........ 715/513 |
| 2005/0160458 A1 * | 7/2005 | Baumgartner ......... H04H 60/46 725/46 |
| 2005/0160461 A1 * | 7/2005 | Baumgartner ......... G11B 27/32 725/52 |
| 2005/0160465 A1 * | 7/2005 | Walker ...................... H04N 5/76 725/86 |
| 2005/0166230 A1 * | 7/2005 | Gaydou ............... G11B 27/034 725/41 |
| 2005/0234840 A1 * | 10/2005 | Bechtold et al. ............... 706/46 |
| 2006/0064716 A1 * | 3/2006 | Sull .................... G06F 17/30793 725/37 |
| 2006/0147116 A1 * | 7/2006 | Le Clerc et al. ............. 382/173 |
| 2006/0262960 A1 * | 11/2006 | Le Clerc ................ G06K 9/32 382/103 |
| 2007/0136685 A1 | 6/2007 | Bhatla et al. |
| 2007/0143493 A1 * | 6/2007 | Mullig .............. G06F 17/30017 709/232 |
| 2007/0174489 A1 * | 7/2007 | Iwabuchi ...................... 709/246 |
| 2007/0186182 A1 * | 8/2007 | Schiller ......................... 715/781 |
| 2008/0052637 A1 * | 2/2008 | Ben-Yoseph et al. ........ 715/800 |
| 2008/0136937 A1 * | 6/2008 | Murakoshi ............. H04N 5/775 348/231.2 |
| 2008/0235749 A1 * | 9/2008 | Jain ..................... H04N 7/17318 725/114 |
| 2009/0106688 A1 * | 4/2009 | Keohane ............. G06F 3/04855 715/786 |
| 2009/0327893 A1 * | 12/2009 | Terry .................... G06F 3/1438 715/719 |
| 2010/0057448 A1 * | 3/2010 | Massimino et al. .......... 704/222 |
| 2010/0153997 A1 * | 6/2010 | Baumgartner ..... H04N 5/44543 725/39 |
| 2010/0179934 A1 * | 7/2010 | Howley et al. ................. 706/12 |
| 2010/0228877 A1 * | 9/2010 | Davenport, Jr. ...... H04H 20/103 709/231 |
| 2010/0242074 A1 * | 9/2010 | Rouse .................... H04L 12/588 725/100 |
| 2010/0264309 A1 * | 10/2010 | Hirose et al. ................. 250/310 |
| 2015/0169205 A1 * | 6/2015 | Yajima .................. G06F 3/0481 715/799 |
| 2015/0242065 A1 * | 8/2015 | Ko ........................ G06F 3/0481 715/779 |

FOREIGN PATENT DOCUMENTS

| | | |
|---|---|---|
| JP | 06044029 | 2/1994 |
| JP | 07210355 | 8/1995 |
| JP | 10187404 | 7/1998 |
| JP | 10320534 | 12/1998 |
| JP | 2007325248 | 12/2007 |

OTHER PUBLICATIONS 10 bit and 16 bit YUV Video Formats (Windows), 2012.*
fourcc YUV pixel formats.*
kioskea.net The YUV Standard.*
bing search q=resize+window+image+text+multimedi Nov. 9, 2015.*
bing search q=resize+window+image+text+video&src Nov. 9, 2015.*
Supplementary European Search Report dated Mar. 15, 2012; issued in conjunction with European Patent Application No. 08870380.6.

(56) References Cited

OTHER PUBLICATIONS

Office Action dated Mar. 27, 2012, issued in conjunction with European Patent Application No. 08870380.6.
Office Action issued in corresponding CN Patent Application No. 200880124276.3, dated Jan. 6, 2014.
Third Notification of Office Action issued in corresponding Chinese Patent Application No. 200880124276.3 dated Jun. 20, 2013.
Notice of Reasons for Rejection issued in corresponding Japanese Patent Application No. 2008-001535 mailed on Feb. 19, 2013.
Office Action issued in corresponding CN Patent Application No. 200880124276.3, dated Mar. 19, 2015, 12 pages.
2nd Notification of Office Action issued in Chinese Patent Application No. 200880124276.3 issued on Sep. 21, 2012.
Notification of Reexamination issued in corresponding CN Patent Application No. 200880124276.3, dated Aug. 28, 2015, pp. 1-10.

* cited by examiner

| ATTRIBUTE | CONDITION |
|---|---|
| L | 3×3 |
| M | 2×1 |
| S | 1×1 |

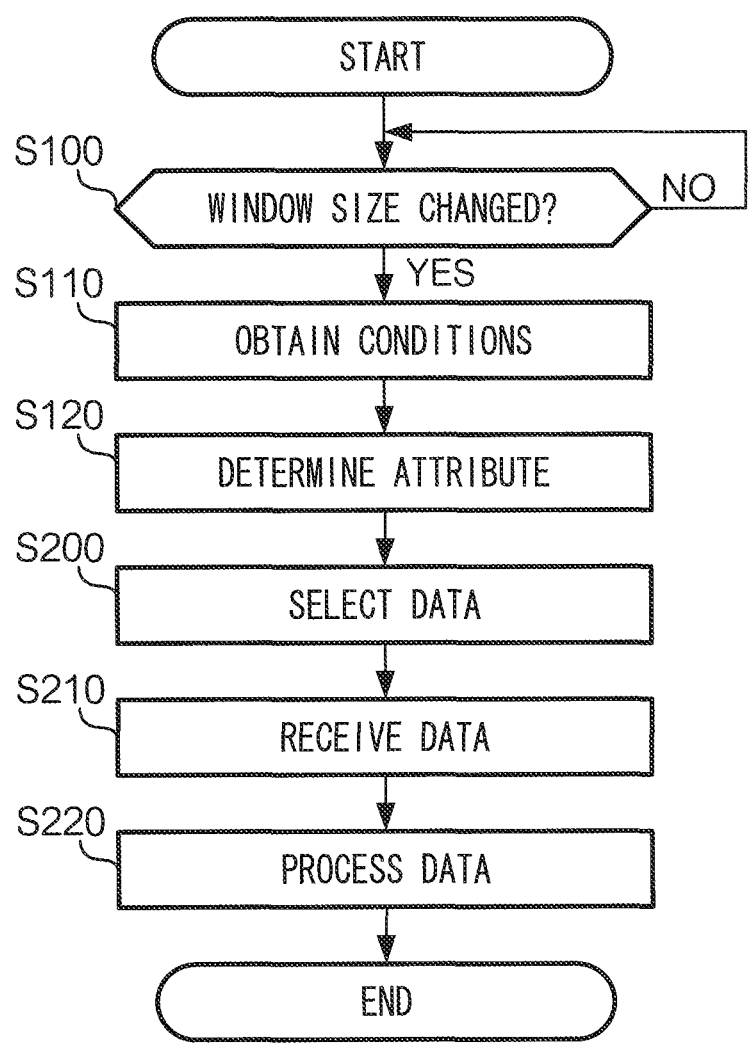

INFORMATION PROCESSING DEVICE AND PROGRAM

FIELD

The present invention relates to a graphical user interface (GUI).

BACKGROUND

There is a type of computer device that displays a screen indicating a processing status of an application program in a certain area (which is usually referred to as a "window") in a display device. In particular, a type of computer device that executes plural programs in parallel and allows users to change a size of a window.

JP-A-10-187404, JP-A-7-210355, and JP-A-6-44029 each disclose techniques for changing display styles of windows, depending on window sizes. JP-A-10-187404 discloses a technique by which, if a program associated with an icon is executing any process when iconizing a window of the program, a mini image of a latest window screen is displayed as the icon. JP-A-7-210355 discloses a technique by which displayed styles of menu buttons in a window are changed depending on a window size. JP-A-6-44029 discloses a technique by which a video in a window specified by a user is normally displayed and videos in other windows are not displayed normally; for example, they are not displayed, time-released, displayed in mosaic, displayed in monochrome, or displayed with reduced brightness, when plural video windows are showing.

SUMMARY

A user's operation of changing a window size may be motivated by any number of different intentions. For example, a user may change a window size when the user intends to show a window of another application in a larger size while, at the same time, the user intends to continue an operation requiring another process. However, none of the techniques described in JP-A-10-187404, JP-A-7-210355, and JP-A-6-44029 is capable of realizing a condition that enables a user's intention as described above to be realized. That is, the known techniques in the art do not enable a processing status of an application to be changed depending on a change made to a window size.

In contrast, the present invention provides a technique for changing a processing status of an application program, depending on a change in a window size, or more specifically, provides a technique for changing data to be processed or for changing an update frequency of data.

According to one aspect of the invention to address the above problem, there is provided an information processing device including: execution means for executing an application program; determination means for determining a size of a window to be displayed depending on the application program; receiving means for receiving at least one data set from among a plurality of data sets; data selection means for selecting one data set from among the plurality of data sets, depending on the window size determined by the determination unit; execution control means for controlling the execution means to process the one data set selected by the data selection means from among the received at least one data set, in accordance with the application program; and display control means for controlling the display means to show a screen based on the one data set to be processed by the execution means.

Alternatively, in the information processing device, the receiving means may receive the plurality of data sets, and the data selection means may select one data set from among the plurality of data sets received by the receiving means, depending on the window size determined by the determination means.

Still alternatively, the information processing device may include: storage means for storing a plurality of attributes and a plurality of conditions, the plurality of attributes indicating data types, and the plurality of conditions respectively associated with window sizes for the plurality of attributes; and extraction means for extracting, from among the plurality of attributes stored in the storage means, an attribute associated with a condition which the window size determined by the determination means satisfies, wherein the plurality of data sets received by the receiving means respectively include attributes, and the execution control means is configured to control the execution means to process the data set including the attribute extracted by the extraction means, from among the plurality of data sets received by the receiving means.

Also, still alternatively, in the information processing device, the plurality of data sets received by the receiving means include a plurality of attributes and a plurality of conditions, the plurality of attributes indicating data types, and the plurality of conditions being respectively for window sizes associated with the plurality of attributes, the information processing device further includes: extraction means for extracting an attribute associated with a condition which the window size determined by the determination means satisfies, from among the plurality of attributes included in the plurality of data sets; and selection means for selecting a data set including the attribute extracted by the extraction means, from among the plurality of data sets received by the receiving means, and the execution control means is configured to control the execution means to process a data set including the attribute extracted by the execution means, from among the plurality of data sets received by the receiving means.

Also, still alternatively, the information processing device further includes transmission means for transmitting information that specifies the data set selected by the data selection means, wherein the receiving means is configured to receive the data set transmitted in accordance with the information transmitted by the transmission means, and the execution control means is configured to control the execution means to process the data set received by the receiving means.

Also, still alternatively in the information processing device, the plurality of data sets respectively may have different information volumes.

Also, still alternatively in the information processing device, the plurality of data sets each may be position data, and respectively has different positioning accuracies.

Also, still alternatively in the information processing device, the execution means is configured to execute a plurality of application programs, the display control means is configured to control the display means to show a plurality of windows respectively depending on the plurality of application programs, and the data selection means is configured to select a data set to be processed by one application program of the plurality of application programs, depending on a relative size of a window for the one application program, the relative size being relative to a size of a window of one other application program of the plurality of application programs.

Also, still alternatively in the information processing device, the execution control means is configured to change a frequency at which data is processed by the execution means, depending on the window size.

According to another aspect of the invention, there is provided an information processing device including: execution means for executing an application program; receiving means for receiving a data set to be processed by the application program executed by the application program; determination means for determining a window size of a window to be displayed depending on the application program; execution control means for controlling a frequency at which the receiving means receives the data set, depending on the window size determined by the determination means from a plurality of data sets received by the receiving means; and display control means for controlling the display means to show a screen based on the data set to be processed by the execution means.

Alternatively, in the information processing device, the execution means is configured to execute a plurality of application programs, the display control means is configured to control the display means to show a plurality of windows respectively depending on the plurality of application programs, and the execution control means is configured to control the frequency at which the receiving means receives the data set, depending on a relative size of a window for one application program of the plurality of application programs, the relative size being relative to a size of a window for one other application program of the plurality of application programs.

According to still another aspect of the invention, there is provided a program causing a computer device to function as: execution means for executing an application program; determination means for determining a size of a window to be displayed depending on the application program; receiving means for receiving at least one data set among a plurality of data sets; data selection means for selecting one data set from among the plurality of data sets, depending on the window size determined by the determination unit; execution control means for controlling the execution means to process the one data set selected by the data selection means from among the received at least one data set, in accordance with the application program; and display control means for controlling the display means to show a screen based on the one data set to be processed by the execution means.

According to still another aspect of the invention, there is provided a program causing a computer device to function as: execution means for executing an application program; receiving means for receiving a data set to be processed by the application program executed by the application program; determination means for determining a window size of a window to be displayed depending on the application program; execution control means for controlling a frequency at which the receiving means receives the data set, depending on a window size determined by the determination means from a plurality of data sets received by the receiving means; and display control means for controlling the display means to show a screen based on the data to be processed by the execution means.

According to the invention, a processing status of an application program, such as data to be processed or updating the frequency of data, changes depending on a change to a window size.

BRIEF DESCRIPTION OF THE DRAWINGS

The invention will be described with reference to the accompanying drawings, wherein like numbers reference like elements:

FIG. 10 shows a flowchart showing operations of a mobile phone 1 according to Modification 6.

DETAILED DESCRIPTION

1. Structure

Figure 1:
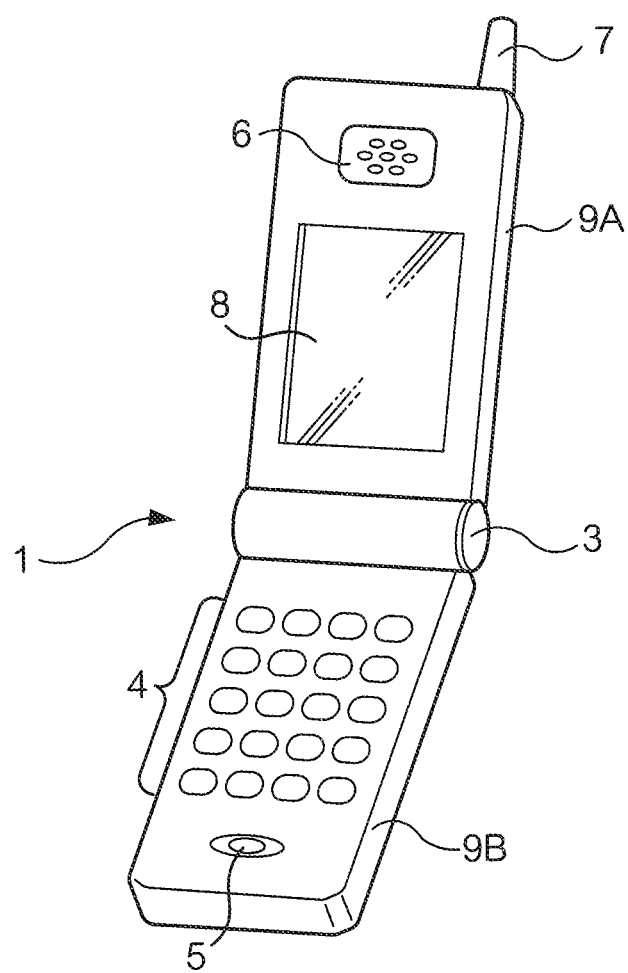
FIG. 1 is an outside view of a mobile phone 1 according to an embodiment of the invention.

FIG. 1 shows an external view of a mobile phone 1 according to one embodiment of the invention. The mobile phone 1 is an example of an information processing device according to the invention. The mobile phone 1 has casings 9A and 9B. The casings 9A and 9B are connected to each other by a hinge 3. The mobile phone 1 is a so-called foldable mobile phone. A user of the mobile phone 1 makes voice communications and data communications with the casings 9A and 9B opened relative to each other, as shown in FIG. 1.

The casing 9A includes a loudspeaker 6, an antenna 7, and a display device 8. The loudspeaker 6 outputs audio, sounds of operation signs, and music. Through the antenna 7, wireless communications are carried out with wireless base stations. The display device 8 displays text and images. The casing 9B includes key pads 4 and a microphone 5. Signals associated with the key pads 4 are output in accordance with operations conducted by users. The microphone 5 converts an input sound into an electric signal, and outputs the signal.

Figure 2:
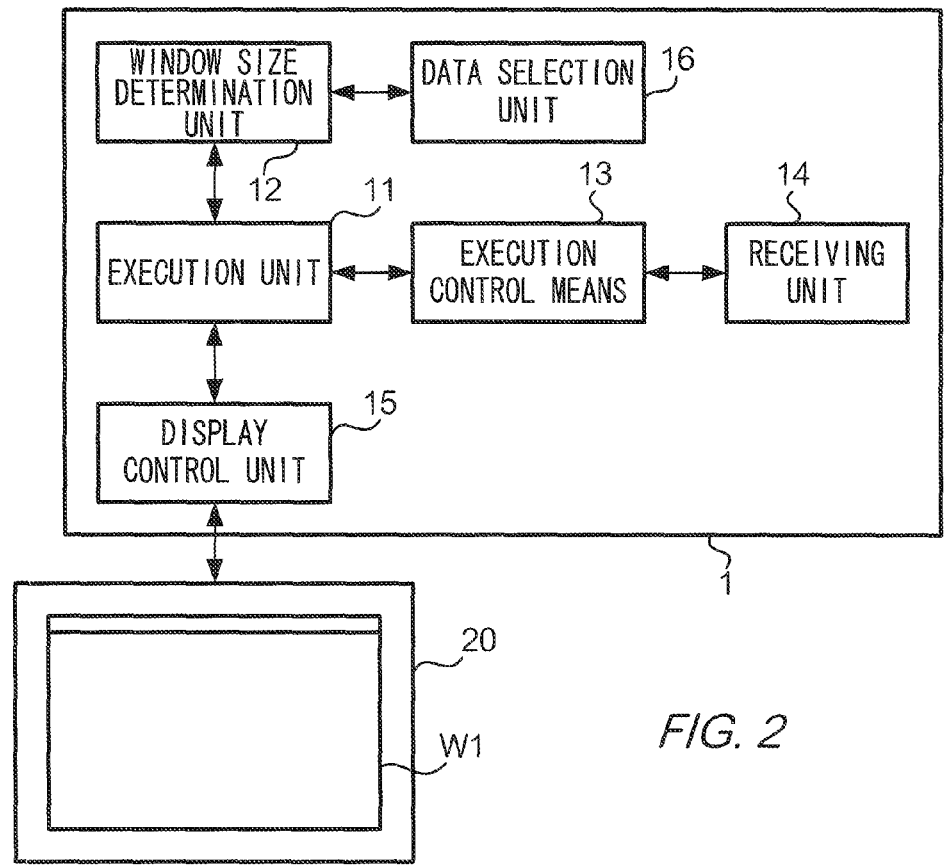
FIG. 2 shows a functional structure of the mobile phone 1.

FIG. 2 shows a functional structure of the mobile phone 1. Depending on the window sizes, the mobile phone 1 selects data to be processed by an application. An execution unit 11 executes an application program. A window size determination unit 12 determines a size of a window to be displayed on a display device 20, depending on the application program. The window size is determined, either based on an instruction from a user or automatically. A receiving unit 14 receives plural data sets to be processed by the application. The plural data sets respectively include their own attributes and have different information volumes. A data selection unit 16 selects one data set from the plural data sets, depending on a determined window size. An execution control unit 13 controls the execution unit 11 to process the selected data set in accordance with the application program. A display control unit 15 controls the display device 20 to show a screen in a window, based on data to be processed by the execution unit 11.

Figure 3:
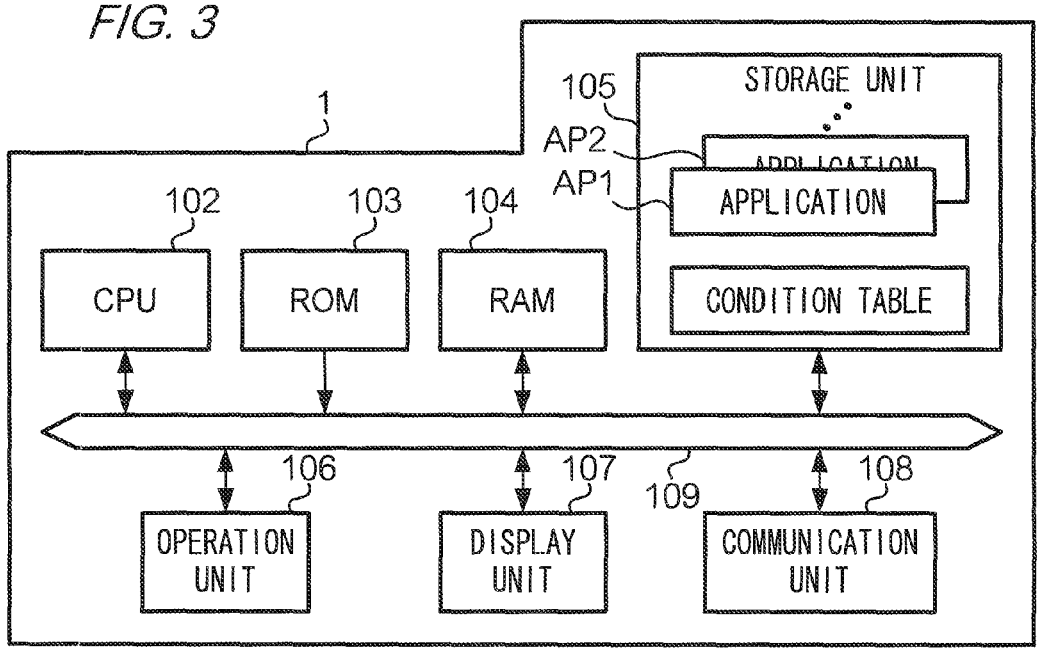
FIG. 3 shows a hardware structure of the mobile phone 1.

FIG. 3 shows a hardware structure of the mobile phone 1. A CPU (Central Processing Unit) 102 is a control device that controls respective components of the mobile phone 1. A ROM (Read Only Memory) 103 is a storage device that stores programs and data that are used for basic operations of the mobile phone 1. The ROM 103 stores, for example, an IPL (Initial Program Loader), an OS (Operating System) program, and a Java (registered trademark) platform program. The IPL reads a program that is executed first after the mobile phone 1 is powered on. In this embodiment, the IPL reads the OS program. The OS program realizes input/output of data, access to a storage device, execution of various programs, voice communications, data communications, and other basic functions of the mobile phone 1. As the CPU 102 executes the OS program, the mobile phone 1 establishes and attains a functional structure as shown in FIG. 2. The Java platform program establishes a Java execution environment on the OS. The Java platform program will be described in detail later.

The RAM (Random Access Memory) 104 functions as a work area when the CPU 102 executes a program. A storage unit 105 stores application programs and data. The storage unit 105 has a non-volatile memory. In this embodiment, the storage unit 105 has plural application programs AP1, AP2, . . . and so on.

An operation unit 106 outputs signals in accordance with user's operations. The operation unit 106 has key pads (e.g., key pads 4 shown in FIG. 1) including ten-keys, a call key, an end call key, a clear key, a cursor key, a power key, and other keys used for input. A user operates the key pads to input instructions to the mobile phone 1. A display unit 107 shows text and images. The display unit 107 shows a window for an application program being executed. The communication unit 108 performs voice communications or data communications through wireless base stations. The foregoing components are connected through a bus 109.

Figure 4:
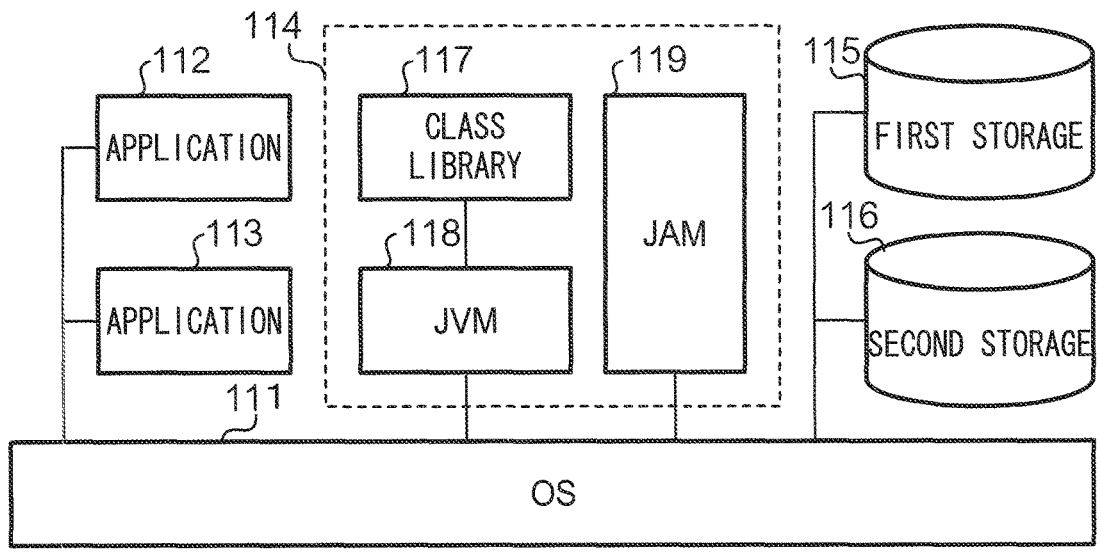
FIG. 4 shows a Java execution environment.

FIG. 4 shows a Java execution environment. As the CPU 102 executes the Java platform program, the Java execution environment 124 shown in FIG. 4 attains a class library 117, a JVM (Java Virtual Machine) 118, and a JAM (Java Application Manager) 119. The class library 117 compiles a group of program modules (classes) having particular functions. The JVM 118 has functions of interpreting and executing bite codes provided as a Java application program. The JAM 119 has functions of downloading, installing, starting up, and terminating a Java application program, and of managing other operations of the Java application program.

A first storage 115 includes an area that stores Java application programs (Jar files and ADFs (Application Descriptive Files)) that are downloaded under management of the JAM 119. A second storage 116 includes an area for storing data, which are generated when executing Java application programs, after the Java application programs are terminated. In the second storage 116, individual storage areas are respectively allocated to Java application programs installed. Data in a storage area allocated to a Java application program is rewritable only while the Java application program is executed, but cannot be rewritten by any other Java application program.

An OS 111 has a multitask function of simultaneously performing plural processings in parallel. On the OS 111, plural applications such as applications 112 and 113 are executed. The display unit 107 shows windows respectively for the applications.

2. Operation

Figure 5:
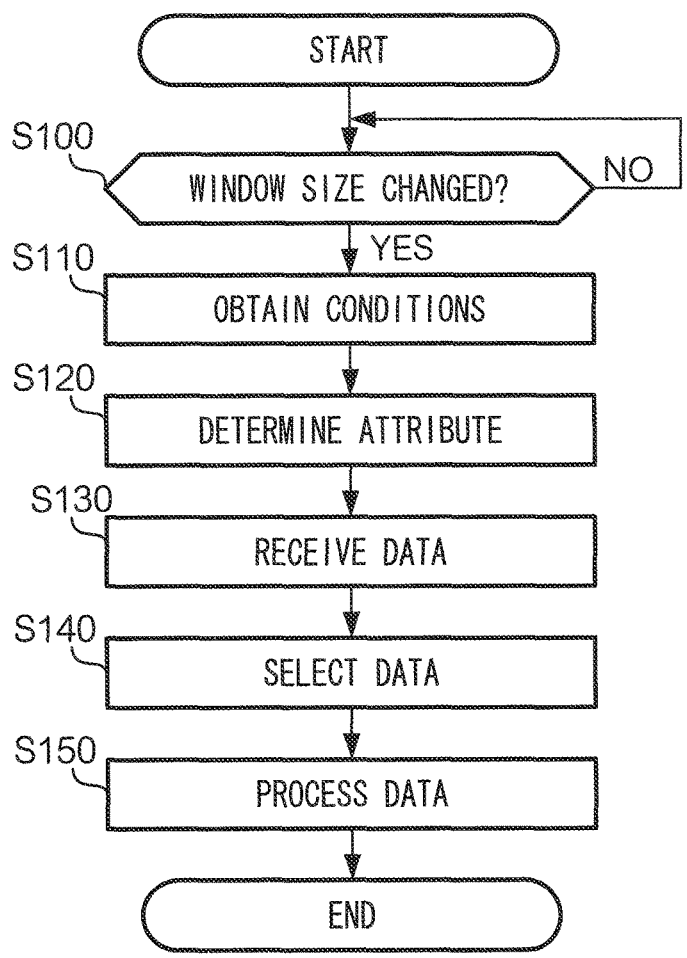
FIG. 5 shows a flowchart showing operations of the mobile phone 1.

FIG. 5 shows a flowchart showing operations of the mobile phone 1 according to an embodiment. In a step S100, the CPU 102 determines whether a window size has been changed or not. A change to a window size is made in accordance with an instruction that a user inputs through the operation unit 106. Otherwise, the window size may be automatically determined by the CPU 102. If a window size is changed, the CPU 102 then determines the window size. If a window size is changed (S100: YES), the CPU 102 proceeds with the processing flow to a step S110. If the window size is not changed (S100: NO), the CPU 102 waits until the window size is changed.

In the step S110, the CPU 102 obtains a condition relating to a window size. In this embodiment, the storage unit 105 stores a condition table including conditions relating to window sizes. The CPU 102 reads the condition table from the storage unit 105.

Figures 6, 7:
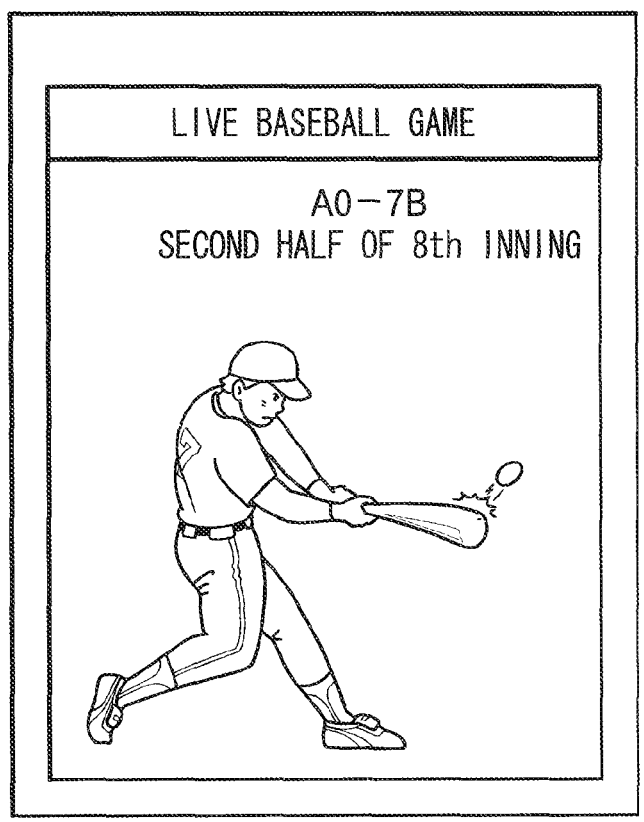
FIG. 6 shows an example of a condition table.
FIG. 7 shows a specific example of a window.

FIG. 6 shows an example of the condition table. The condition table includes plural data sets each of which includes an attribute and a condition associated with the attribute. In the example shown in FIG. 6, the condition table stores three data sets associated with attributes L, M, and S. In this example, the condition table stores thresholds for window sizes, as conditions. For example, according to the condition table shown in FIG. 6, if a window size is "3×3" or larger, the window size corresponds to the attribute "L". If a window size is "2×1" or larger and is smaller than "3×3", the window size corresponds to the attribute "M". If a window size is "1×1" or larger and is smaller than "2×1", the window size corresponds to the attribute "S". That is, window sizes decrease from the greatest one in the order of L, M, and S.

A description will now be made again with reference to FIG. 5. In a step S120, the CPU 102 determines an attribute corresponding to a window size. That is, the CPU 102 extracts an attribute associated with a condition that a window size satisfies. Hereinafter, the attribute extracted from the condition table will be referred to as a "target attribute".

In a step S130, the CPU 102 receives data to be processed by an application. In this step, the CPU 102 obtains data from another device such as a server device through a network and a base station (both not shown) and the communication unit 108. The data to be obtained in this step includes three data sets associated with the attributes "L", "M", and "S" (which will be hereinafter referred to as "sub-data sets"). The sub-data sets have respectively different information volumes. In the following, the three sub-data sets associated with the attributes "L", "M", and "S" will be referred to as sub-data sets L, M, and S, respectively.

In a step S140, the CPU 102 selects a sub-data set including the target attribute from the received data. For example, if the target attribute is "L", the CPU 102 selects a sub-data set L. In a step S150, the CPU 102 processes the selected sub-data set in accordance with an application program.

Figure 8:
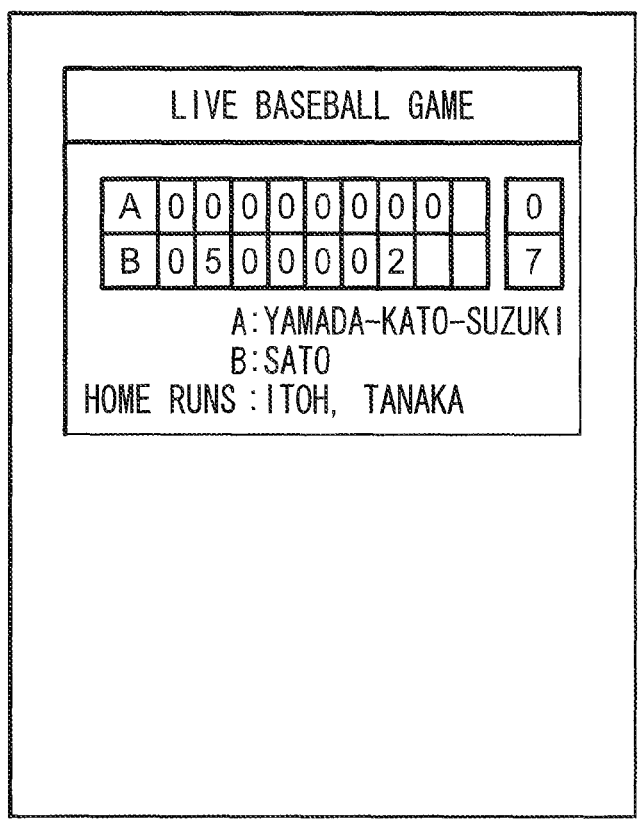
FIG. 8 shows a specific example of another window.
Figure 9:
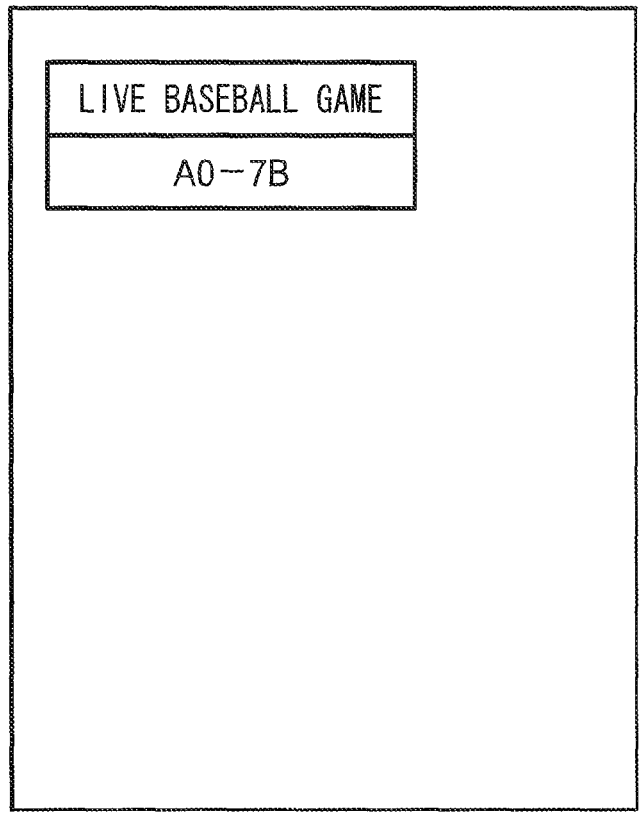
FIG. 9 shows a specific example of still another window.

FIGS. 7, 8, and 9 show specific examples of windows. A description will now be made of a case in which an application as a processing target is to display live action of a baseball game. In this example, the sub-data set L is video data of live action of a baseball game. The sub-data set M is text data that expresses scores in each inning, replacements of pitchers, and batters who hit home runs. The sub-data set S is text data that expresses scores. Data volumes of the data sets satisfy a relationship of (sub-data set L)>(sub-data set M)>(sub-data set S).

FIG. 7 shows an example of a case that a window satisfies a condition associated with the attribute "L". At this time, data to be processed by the application is the sub-data set L, which is video data. FIG. 8 shows an example of a case that a window satisfies a condition associated with the attribute "M". At this time, data to be processed by the application is text data that expresses scores including the sub-data set M, i.e., scores in each inning FIG. 9 shows an example of a case that a window satisfies a condition associated with the sub-data set "S". At this time, data to be processed by the application is text data that expresses the sub-data set S, i.e., scores.

As has been described above, data to be processed is selected depending on window sizes. That is, a processing status of an application program changes in accordance with a change made to a window size. A fact that a change has been made to a window size implies that a user had an intention to carry out some other operation. For example, in the example of live action of a baseball game described in the embodiment, a reduction of a window size is considered to have taken place because a user intended to find out some form of other related intermittent information (such as progress or scores of the game), if any, while the user is not greatly interested in watching live action of the baseball game continuously.

When switching screens to be displayed, there may be respectively operated as separate applications, for example, an application for displaying a video and an application for displaying text. However, according to this embodiment, display content can be changed by using a much simpler configuration than is the case where a configuration is used for switching screens by use of such plural applications.

The above embodiment has been described with reference only to a case in which a window size is changed in the flow shown in FIG. 5. Once a sub-data set to be processed is selected, the CPU 102 then processes the selected sub-data set. For example, a window size is changed to a size that satisfies a condition associated with the attribute "L", and the changed size is maintained thereafter. If the CPU 102 simultaneously continues receiving video data, the CPU 102 also continues processing the sub-data set L, which is video data.

3. Further Embodiments

The invention is not limited only to the embodiment described above but can be variously modified in practice. Some modifications will now be described below. Two or more of the modifications below may be used in combination with each other.

3-1. Modification 1

The condition table need not always be pre-stored in the storage unit 105. For example, the condition table may be included in data to be processed. In this case, the CPU 102 extracts a condition table from received data. Conditions concerning window sizes are not limited to those shown in FIG. 6. Insofar as conditions associate window sizes with attributes, any type of conditions may be utilized.

3-2. Modification 2

The CPU 102 may process plural application programs in parallel. In this case, the display unit 107 displays plural windows. The CPU 102 may execute processings as described above on each of the plural windows. In this case, conditions concerning window sizes, which are included in the condition table, may concern a relationship between relative sizes (e.g., a ratio or a difference between window sizes) of a window (e.g., a window shown in the front end or a window having the largest area) and another window as a processing target among the plural windows.

3-3. Modification 3

Concerning window sizes, a method for controlling a volume of data processing is not limited to that described in the embodiment. The embodiment has been described with reference to an example in which the volume of data processing decreases as the window size decreases. However, the volume of data processing may be increased as the window size increases. The volume of data processing is expressed as a product of a data processing volume per unit time and a data processing frequency. Therefore, at least one of the data processing volumes per unit time and the data processing frequency needs to be controlled. The embodiment has been described with reference to an example in which data processing volumes per unit time differ (video>a great amount of text>a small amount of text). An example in which data processing frequency is controlled will now be described below.

For example, an application for displaying stock quotations will now be taken into consideration, as an application as a processing target. Data to be processed includes chronographic changes of stock prices. The sub-data set L is image data that shows a so-called stock price chart. The sub-data set M is text data that expresses highest, lowest, and current stock prices. The sub-data set S is text data that expresses current stock prices. In this case, the CPU 102 sets update frequencies of the sub-data sets L, M, and S in an order of sub-data set L>sub-data set M>sub-data set S, i.e., so that the processing frequency increases as the window size increases. Otherwise, the CPU 102 may set the update frequencies so that the processing frequency decreases as the window size increases. Further, both of the data processing volume per unit time and the data processing frequency may be changed depending on the window sizes. In brief, any configuration may be adopted insofar as allocations of resources are controlled depending on the window sizes.

3-4. Modification 4

Targets to be controlled depending on the window sizes are not limited to the data processing volume. For example, an application that measures and displays a position of the mobile phone 1 will now be taken into consideration, as an application as a processing target. In this example, data to be processed by the application includes two sub-data sets for attributes "L" and "S". The sub-data set L is positioning data obtained by a GPS (Global Positioning System), and the sub-data set S is positioning data based on a position of a base station. At this time, accuracy of data processed by the application satisfies a relationship of sub-data set L>sub-data set S.

3-5. Modification 5

Data formats of data received by the mobile phone 1 are not limited to those described in the embodiment. Data received by the mobile phone 1 may be content data including meta data. In an example of the embodiment, content data is video data of live action of a baseball game (FIG. 7), and meta data includes text data that expresses information such as scores in each inning (FIG. 8) and text data that expresses scores (FIG. 9).

In this example, the CPU 102 may reproduce only audio data included in video data if a window satisfies a condition, e.g., if a window has been changed to a size corresponding to the attribute "S".

3-6. Modification 6

FIG. 10 is a flowchart showing operations of a mobile phone 1 according to Modification 6. In this example, a flow shown in FIG. 10 is adopted in place of the flow shown in FIG. 5. The flows shown in FIGS. 5 and 10 differ from each other in the following point. According to the flow of FIG. 5, the mobile phone 1 receives three data sets of attributes "L", "M", and "sub-data set", and data to be processed is selected from the received data. Meanwhile, according to the flow of FIG. 10, the mobile phone 1 firstly selects data to be processed and receives only the selected data. In FIG. 10, processings common to FIG. 5 will be described using common reference symbols.

Processings in steps S110 to S120 are the same as those described in the embodiment and will be therefore omitted from the following descriptions. In a step S200, the CPU 102 selects data associated with a target attribute. Specifically, the CPU 102 transmits information indicating the selected data, which is the target attribute in this example, to a server device along with a data transmission request.

The server device stores data having plural attributes, i.e., sub-data sets L, M, and S that respectively have three attributes L, M, and S. The server device has a function of transmitting data having a requested attribute to a device as a requester, among the stored data. Specifically, if the server device receives a data transmission request, the server device then selects data having the requested attribute from the stored data. The server device transmits the selected data to the mobile phone 1 as a device as a requester. For example, if a target attribute is "L", the server device transmits a sub-data set L to the mobile phone 1.

In a step S210, the CPU 102 receives data transmitted from the server device, i.e., the selected data. In a step S220, the CPU 102 processes the received data in accordance with an application program. In this example, network traffic is reduced to a greater extent than in a case of receiving all data having the three attributes.

3-7. Other Modifications

Information processing devices to which the invention is applicable are not limited to mobile phones. Information processing devices may be personal computers, PDAs (Personal Data Assistants), electronic notebooks, wireless communication terminals, wired communication terminals, and many other types of devices. Further, hardware structures of such information processing devices are not limited to that shown in FIG. 2. One or more components may be omitted from components shown in FIG. 2. For example, an information processing device may have no display unit. In this case, the information processing device is connected to a display device that is separate from the information processing device. The information processing device outputs data or a signal for controlling display to the display device. In brief, insofar as an information processing device has a required functional structure, the information processing device may be a device of any type and the information processing device may have any hardware structure. Further, languages in which application programs are written are not limited to Java. Application programs may also be written in a language other than Java.

In the above embodiment, the OS has the function of displaying a window depending on an application. A program other than the OS may have this function. In this case, the program having the function may be downloaded through a network. Otherwise, the program may be provided in the form of a storage medium such as a CD-ROM (Compact Disc Read Only Memory) that records the program.

What is claimed is:

1. An information processing device comprising:
   execution means for executing a plurality of application programs in parallel;
   storage means for storing a plurality of conditions, the plurality of conditions including a size of a window to be displayed for each of the plurality of application programs, the plurality of conditions further including a relationship between relative sizes of a first window of a first application program and a second window of a second application program;
   determination means for determining the size of the window to be displayed depending on the application program;
   receiving means for receiving at least one data set from among a plurality of data sets, wherein each data set of the plurality of data sets includes a different type of data depending on the size of the window, wherein the type of data is selected from at least one of text and video;
   data selection means for selecting one data set from among the plurality of data sets, depending on the size of the window determined by the determination unit;
   execution control means for controlling the execution means to process the one data set selected by the data selection means from among the received at least one data set, in accordance with the application program; and
   display control means for controlling the display means to show a screen based on the one data set to be processed by the execution means,
   wherein when the size of the window is changed, the type of data displayed is changed in response to the change in the size of the window, and
   further wherein a processing conducted by the window continues when the size of the window is changed.

2. The information processing device according to claim 1, wherein
   the receiving means is configured to receive the plurality of data sets, and
   the data selection means is configured to select one data set from among the plurality of data sets received by the receiving means, depending on the size of the window determined by the determination means.

3. The information processing device according to claim 2, further comprising:
   a plurality of attributes stored in the storage means, the plurality of attributes indicating data types; and
   extraction means for extracting, from among the plurality of attributes stored in the storage means, an attribute associated with a condition which the size of the window determined by the determination means satisfies, wherein
   the plurality of data sets received by the receiving means respectively include attributes, and
   the execution control means is configured to control the execution means to process the data set including the attribute extracted by the extraction means, from among the plurality of data sets received by the receiving means.

4. The information processing device according to claim 2, wherein
   the plurality of data sets received by the receiving means include a plurality of attributes and a plurality of conditions, the plurality of attributes indicating data types, and the plurality of conditions being respectively for window sizes associated with the plurality of attributes,
   the information processing device further comprises:
   extraction means for extracting an attribute associated with a condition which the window size determined by the determination means satisfies, from among the plurality of attributes included in the plurality of data sets; and
   selection means for selecting a data set including the attribute extracted by the extraction means, from among the plurality of data sets received by the receiving means, and
   the execution control means is configured to control the execution means to process a data set including the attribute extracted by the execution means, from among the plurality of data sets received by the receiving means.

5. The information processing device according to claim 1, further comprising transmission means for transmitting information that specifies the data set selected by the data selection means, wherein the receiving means is configured to receive the data set transmitted in accordance with the information transmitted by the transmission means, and the execution control means is configured to control the execution means to process the data set received by the receiving means.

6. The information processing device according to claim 1, wherein the plurality of data sets respectively have different information volumes.

7. The information processing device according to claim 1, wherein the plurality of data sets each are position data, and respectively have different positioning accuracies.

8. The information processing device according to claim 1, wherein the execution control means is configured to change a frequency at which data is processed by the execution means, depending on the window size.

9. An information processing device comprising:

execution means for executing a plurality of application programs in parallel;

storage means for storing a plurality of conditions, the plurality of conditions including a size of a window to be displayed for each of the plurality of application programs, the plurality of conditions further including a relationship between relative sizes of a first window of a first application program and a second window of a second application program;

receiving means for receiving a data set to be processed by the application program executed by the application program;

determination means for determining the size of the window to be displayed depending on the application program;

execution control means for controlling a frequency at which the receiving means receives the data set, depending on the size of the window determined by the determination means from a plurality of data sets received by the receiving means, wherein each data set of the plurality of data sets includes a different type of data depending on the size of the window, wherein the type of data is selected from at least one of text and video; and display control means for controlling the display means to show a screen based on the data set to be processed by the execution means, wherein when the size of the window is changed, the type of data displayed is changed in response to the change in the size of the window, and further wherein a processing conducted by the window continues when the size of the window is changed.

10. A computer program product embodied in a non-transitory computer readable medium, causing a computer device to function as:

execution means for executing a plurality of application programs in parallel;

storage means for storing a plurality of conditions, the plurality of conditions including a size of a window to be displayed for each of the plurality of application programs, the plurality of conditions further including a relationship between relative sizes of a first window of a first application program and a second window of a second application program;

determination means for determining the size of the window to be displayed depending on the application program;

receiving means for receiving at least one data set among a plurality of data sets, wherein each data set of the plurality of data sets includes a different type of data depending on the size of the window, wherein the type of data is selected from at least one of text and video;

data selection means for selecting one data set from among the plurality of data sets, depending on the size of the window determined by the determination unit;

execution control means for controlling the execution means to process the one data set selected by the data selection means from among the received at least one data set, in accordance with the application program; and display control means for controlling the display means to show a screen based on the one data set to be processed by the execution means, wherein when the size of the window is changed, the type of data displayed is changed in response to the change in the size of the window, and further wherein a processing conducted by the window continues when the size of the window is changed.

11. A computer program product embodied in a non-transitory computer readable medium, causing a computer device to function as:

execution means for executing a plurality of application programs in parallel;

storage means for storing a plurality of conditions, the plurality of conditions including a size of a window to be displayed for each of the plurality of application programs, the plurality of conditions further including a relationship between relative sizes of a first window of a first application program and a second window of a second application program;

receiving means for receiving a data set to be processed by the application program executed by the application program;

determination means for determining the size of the window to be displayed depending on the application program;

execution control means for controlling a frequency at which the receiving means receives the data set, depending on the size of the window determined by the determination means from a plurality of data sets received by the receiving means, wherein each data set of the plurality of data sets includes a different type of data depending on the size of the window, wherein the type of data is selected from at least one of text and video; and display control means for controlling the display means to show a screen based on the data to be processed by the execution means, wherein when the size of the window is changed, the type of data displayed is changed in response to the change in the size of the window, and further wherein a processing conducted by the window continues when the size of the window is changed.

12. The information processing device according to claim 1, wherein when:

the size of the window increases, the amount of data increases and the window displays complex data; and the size of the window decreases, the amount of data decreases and the window displays simplified data.

13. The information processing device according to claim 1, wherein the window displays data in a combination of text and video.

14. The information processing device according to claim 9, wherein when:
the size of the window increases, the amount of data increases and the window displays complex data; and
the size of the window decreases, the amount of data decreases and the window displays simplified data.

15. The information processing device according to claim 9, wherein the window displays data in a combination of text and video.

16. The computer program product according to claim 10, wherein when:
the size of the window increases, the amount of data increases and the window displays complex data; and
the size of the window decreases, the amount of data decreases and the window displays simplified data.

17. The computer program product according to claim 10, wherein the window displays data in a combination of text and video.

18. The computer program product according to claim 11, wherein when:
the size of the window increases, the amount of data increases and the window displays complex data; and
the size of the window decreases, the amount of data decreases and the window displays simplified data.

19. The computer program product according to claim 11, wherein the window displays data in a combination of text and video.

* * * * *